United States Patent [19]
McCabe et al.
[11] 4,294,282
[45] Oct. 13, 1981

[54] APPARATUS AND SYSTEM FOR CONTROLLING THE AIR-FUEL RATIO SUPPLIED TO A COMBUSTION ENGINE

[75] Inventors: Ralph P. McCabe, Troy; Keith D. Marsh, St. Clair Shores, both of Mich.

[73] Assignee: Colt Industries Operating Corp, New York, N.Y.

[21] Appl. No.: 61,428

[22] Filed: Jul. 27, 1979

[51] Int. Cl.[3] ........................ F16K 31/06; F16K 11/14

[52] U.S. Cl. ................................ 137/595; 137/625.18; 123/438

[58] Field of Search ........... 137/625.5, 625.18, 625.62, 137/625.64; 123/438; 137/595

[56] References Cited

U.S. PATENT DOCUMENTS

| | | | |
|---|---|---|---|
| 3,263,959 | 8/1966 | Wisniewski | 137/625.5 X |
| 3,444,895 | 5/1969 | Schnittker | 137/625.65 |
| 4,175,103 | 11/1979 | Stoltman | 137/625.65 X |

FOREIGN PATENT DOCUMENTS

| | | | |
|---|---|---|---|
| 243541 | 3/1963 | Australia | 137/625.65 |
| 2723365 | 11/1978 | Fed. Rep. of Germany | 137/625.5 |

*Primary Examiner*—Arnold Rosenthal
*Attorney, Agent, or Firm*—Walter Potoroka, Sr.

[57] ABSTRACT

A carbureting type fuel metering apparatus has an induction passage into which fuel is fed by several fuel metering systems among which are a main fuel metering system and an idle fuel metering system, as generally known in the art; engine exhaust gas analyzing means sensitive to selected constituents of such exhaust gas creates feedback signal means which through associated solenoid transducer means become effective for controllably modulating the metering characteristics of the main fuel metering system, and, if desired, the idle fuel metering system as to thereby achieve the then desired optimum metering functions.

17 Claims, 7 Drawing Figures

APPARATUS AND SYSTEM FOR CONTROLLING THE AIR-FUEL RATIO SUPPLIED TO A COMBUSTION ENGINE

BACKGROUND OF THE INVENTION

Even though the automotive industry has over the years, if for no other reason than seeking competitive advantages, continually exerted efforts to increase the fuel economy of automotive engines, the gains continually realized thereby have been deemed by various levels of governments to be insufficient. Further, such levels of government have also imposed regulations specifying the maximum permissible amounts of carbon monoxide (CO), hydrocarbons (HC) and oxides of nitrogen ($NO_x$) which may be emitted by the engine exhaust gases into the atmosphere.

Unfortunately, the available technology employable in attempting to attain increases in engine fuel economy is, generally, contrary to that technology employable in attempting to meet the governmentally imposed standards on exhaust emissions.

For example, the prior art, in trying to meet the standards for $NO_x$ emissions, has employed a system of exhaust gas recirculation whereby at least a portion of the exhaust gas is re-introduced into the cylinder combustion chamber to thereby lower the combustion temperature therein and consequently reduce the formation of $NO_x$.

The prior art has also proposed the use of the engine crankcase recirculation means whereby the vapors which might otherwise become vented to the atmosphere are introduced into the engine combustion chambers for burning.

The prior art has also proposed the use of fuel metering means which are effective for metering a relatively overly-rich (in terms of fuel) fuel-air mixture to the engine combustion chamber means as to thereby reduce the creation of $NO_x$ within the combustion chamber. The use of such overly rich fuel-air mixtures results in a substantial increase in CO and HC in the engine exhaust, which, in turn, requires the supplying of additional oxygen, as by an associated air pump, to such engine exhaust in order to complete the oxidation of the CO and HC prior to its delivery into the atmosphere.

The prior art has also heretofore proposed retarding of the engine ignition timing as a further means for reducing the creation of $NO_x$. Also, lower engine compression ratios have been employed in order to lower the resulting combustion temperature within the engine combustion chamber and thereby reduce the creation of $NO_x$.

The prior art has also proposed the use of fuel metering injection means instead of the usually-employed carbureting apparatus and, under superatmospheric pressure, injecting the fuel into either the engine intake manifold or directly into the cylinders of a piston type internal combustion engine. Such fuel injection system, besides being costly, have not proven to be generally successful in that the system is required to provide metered fuel flow over a very wide range of metered fuel flows. Generally, those injection system which are very accurate at one end of the required range of metered fuel flows, are relatively inaccurate at the opposite end of that same range of metered fuel flows. Also, those injection systems which are made to be accurate in the mid-portion of the required range of metered fuel flows are usually relatively inaccurate at both ends of that same range. The use of feedback means for altering the metering characteristics of a particular fuel injection system have not solved the problem because the problem usually is intertwined with such factors as: effective aperture area of the injector nozzle; comparative movement required by the associated nozzle pintle or valving member; inertia of the nozzle valving member and nozzle "cracking" pressure (that being the pressure at which the nozzle opens). As should be apparent, the smaller the rate of metered fuel flow desired, the greater becomes the influence of such factors thereon.

It is now anticipated that the said various levels of government will be establishing even more stringent exhaust emission limits of, for example, 1.0 gram/mile of $NO_x$ (or even less).

The prior art, in view of such anticipated requirements with respect to $NO_x$, has suggested the employment of a "three-way" catalyst, in a single bed, within the stream of exhaust gases as a means of attaining such anticipated exhaust emission limits. Generally, a "three-way" catalyst (as opposed to the "two-way" catalyst system also well known in the prior art) is a single catalyst, or catalyst mixture, which catalyzes the oxidation of hydrocarbons and carbon monoxide and also the reduction of oxides of nitrogen. It has been discovered that a difficulty with such a "three-way" catalyst system is that if the fuel metering is too rich (in terms of fuel), the $NO_x$ will be reduced effectively, but the oxidation of CO will be incomplete. On the other hand, if the fuel metering is too lean, the CO will be effectively oxidized but the reduction of $NO_x$ will be incomplete. Obviously, in order to make such a "three-way" catalyst system operative, it is necessary to have very accurate control over the fuel metering function of associated fuel metering supply means feeding the engine. As hereinafter described, the prior art has suggested the use of fuel injection means with associated feedback means (responsive to selected indicia of engine operating conditions and parameters) intended to continuously alter or modify the metering characteristics of the fuel injection means. However, at least to the extent hereinafter indicated, such fuel injection systems have not proven to be successful.

It has also heretofore been proposed to employ fuel metering means, of a carbureting type, with feedback means responsive to the presence of selected constituents comprising the engine exhaust gases. Such feedback means were employed to modify the action of a main metering rod of a main fuel metering system of a carburetor. However, tests and experience have indicated that such a prior art carburetor and such a related feedback means cannot, at least as presently conceived, provide the degree of accuracy required in the metering of fuel to an associated engine as to assure meeting, for example, the said anticipated exhaust emission standards.

Accordingly, the invention as disclosed, described and claimed is directed generally to the solution of the above and related problems and more specifically to structure, apparatus and system enabling a carbureting type fuel metering device to meter fuel with an accuracy at least sufficient to meet the said anticipated standards regarding engine exhaust gas emissions.

SUMMARY OF THE INVENTION

According to one aspect of the invention, a carburetor having an induction passage therethrough with a venturi therein having a main discharge nozzle situated generally within the venturi and a main fuel metering system communicating generally between a fuel reservoir and the main fuel discharge nozzle, and having an idle fuel metering system communicating generally between a fuel reservoir and said induction passage at a location generally in close proximity to an edge of a variably openable throttle valve situated in said induction passage downstream of the main fuel discharge nozzle, is provided with solenoid valving means effective to controllably alter the rate of metered fuel flow through the main fuel metering system and/or the idle fuel metering system as to thereby precisely control the rate of total metered fuel flow through such metering system to the associated engine.

Various general and specific objects, advantages and aspects of the invention will become apparent when reference is made to the following detailed description of the invention considered in conjuction with the related accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT

Figure 1:
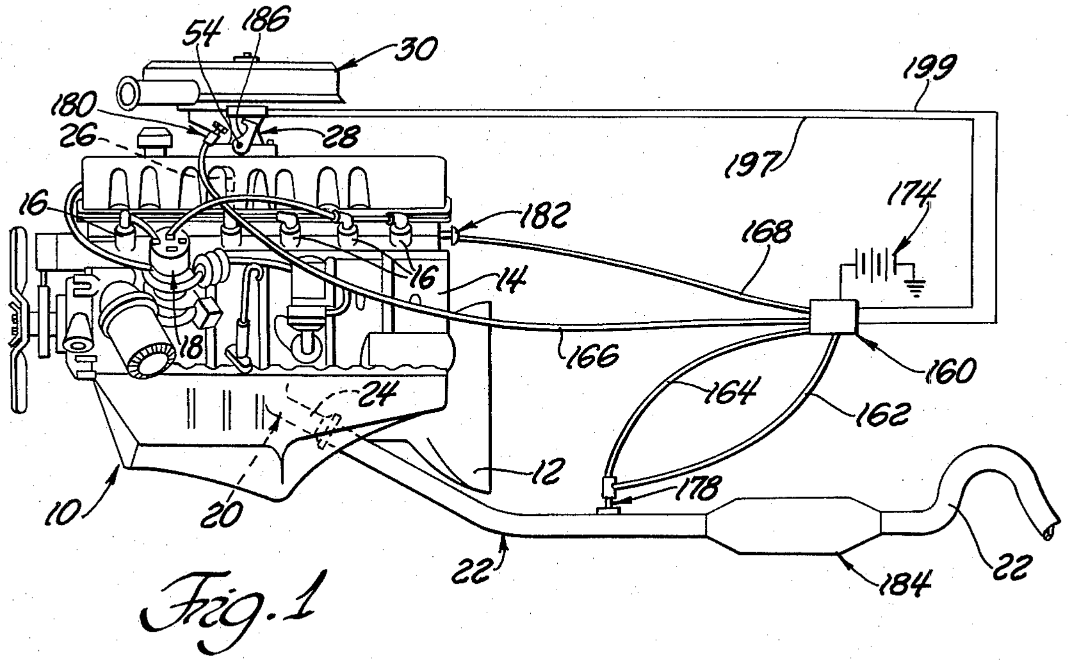
FIG. 1 illustrates, in side elevational view, a vehicular combustion engine employing a carbureting apparatus and system employing teachings of the invention.

Referring now in greater detail to the drawings, FIG. 1 illustrates a combustion engine 10 used, for example, to propell an associated vehicle as through power transmission means fragmentarily illustrated at 12. The engine 10 may, for example, be of the internal combustion type employing, as is generally well known in the art, a plurality of power piston means therein. As generally depicted, the engine assembly 10 is shown as being comprised of an engine block 14 containing, among other things, a plurality of cylinders respectively reciprocatingly receiving said power pistons therein. A plurality of spark or ignition plugs 16, as for example one for each cylinder, are carried by the engine block and respectively electrically connected to an ignition distributor assembly or system 18 operated in timed relationship to engine operation.

As is generally well known in the art, each cylinder containing a power piston has exhaust aperture or port means and such exhaust port means communicate as with an associated exhaust manifold which is fragmentarily illustrated in hidden line at 20. Exhaust conduit means 22 is shown operatively connected to the discharge end 24 of exhaust manifold 20 and leading as to the rear of the associated vehicle for the discharging of exhaust gases to the atmosphere.

Further, as is also generally well known in the art, each cylinder which contains a power piston also has inlet aperture means or port means and such inlet aperture means communicate as with an associated inlet manifold which is fragmentarily illustrated in hidden line at 26.

As generally depicted, a carbureting type fuel metering apparatus 28 is situated atop a cooperating portion of the inlet or intake manifold means 26. A suitable inlet air cleaner assembly 30 may be situated atop the carburetor assembly 28 to filter the air prior to its entrance into the inlet of the carburetor 28.

Figure 2:
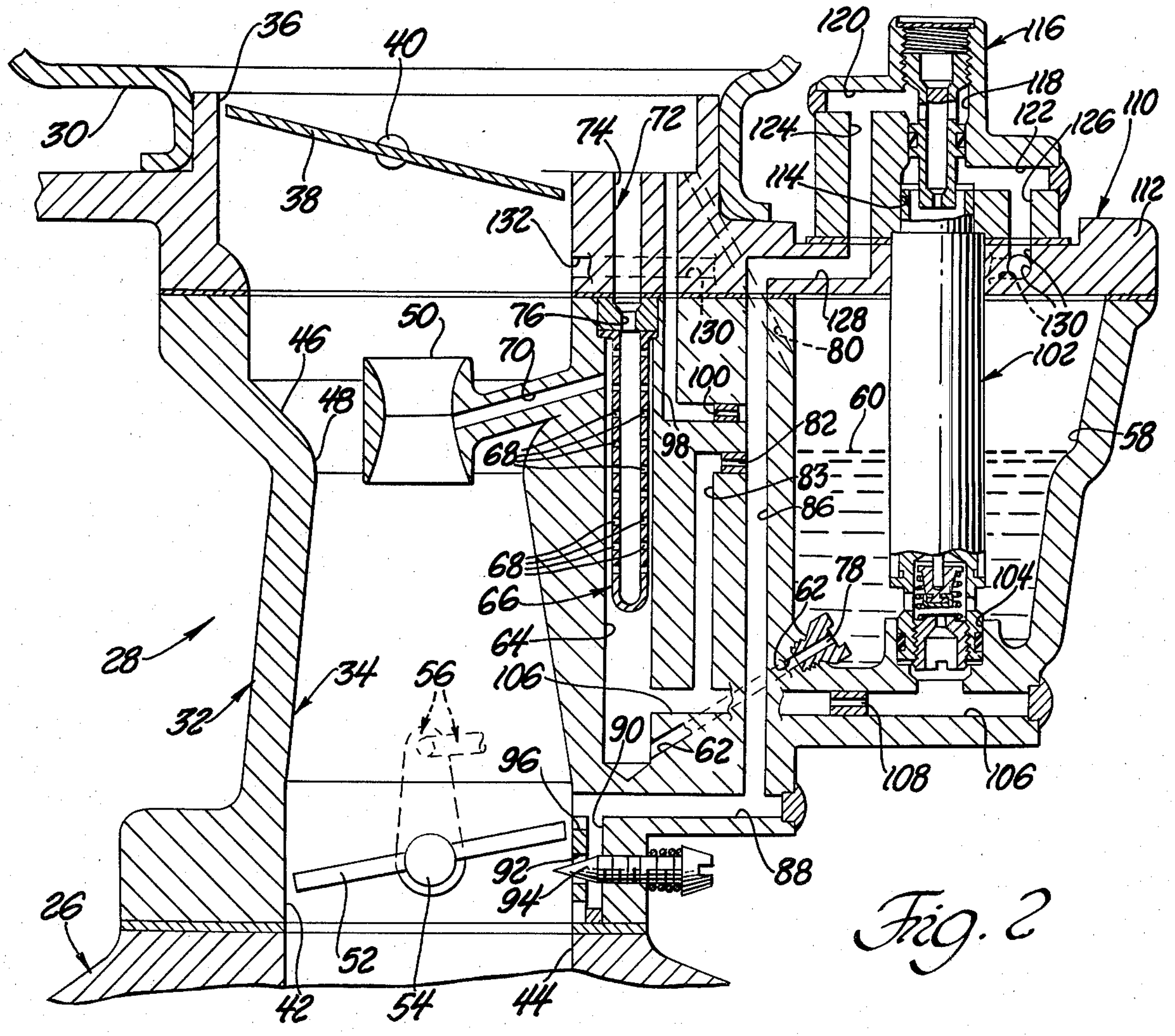
FIG. 2 is an enlarged cross-sectional view of a carbureting assembly employable as in the overall arrangement of FIG. 1.

FIG. 2 illustrates the carburetor 28, employing teachings of the invention, as comprising a main carburetor body 32 having induction passage means 34 formed therethrough with an upper inlet end 36, in which generally is situated a variably openable choke valve 38 carried as by a pivotal choke shaft 40, and a discharge end 42 communicating as with the inlet 44 of intake manifold 26. A venturi section 46, having a venturi throat 48, is provided within the induction passage means 34 generally between the inlet 36 and outlet or discharge end 42. A main metering fuel discharge nozzle 50, situated generally within the throat 48 of venturi section 46, serves to discharge fuel, as is metered by the main metering system, into the induction passage means 34.

A variably openable throttle valve 52, carried as by a rotatable throttle shaft 54, serves to variably control the discharge and flow of combustible (fuel-air) mixtures into the inlet 44 of intake manifold 26. Suitable throttle control linkage means, as generally depicted at 56, is provided and operatively connected to throttle shaft 54 in order to affect throttle positioning in response to vehicle operator demand. The throttle valve, as will become more evident, also serves to vary the rate of fuel flow metered by the associated idle fuel metering system and discharged into the induction passage means.

Carburetor body means 32 may be formed as to also define a fuel reservoir chamber 58 adapted to contain fuel 60 therein the level of which may be determined as by, for example, a float operated fuel inlet valve assembly, as is generally well known in the art.

The main fuel metering system comprises passage or conduit means 62 communicating generally between fuel chamber 58 and a generally upwardly extending main fuel well 64 which, as shown, may contain a main well tube 66 which, in turn, is provided with a plurality of generally radially directed apertures 68 formed through the wall thereof as to thereby provide for communication as between the interior of the tube 66 and the portion of the well 64 generally radially surrounding the tube 66. Conduit means 70 serves to communicate between the upper part of well 64 and the interior of discharge nozzle 50. Air bleed type passage means 72, comprising conduit means 74 and calibrated restriction or metering means 76, communicates as between a source of filtered air and the upper part of the interior of well tube 66. A main calibrated fuel metering restriction 78 is situated generally upstream of well 64, as for example in conduit means 62, in order to meter the rate of fuel flow from chamber 58 to main well 64. As is generally well known in the art, the interior of fuel reservoir chamber 58 is preferably pressure vented to a source of generally ambient air as by means of, for example, vent-like passage means 80 leading from chamber 58 to the inlet end 36 of induction passage 34.

Generally, when the engine is running, the intake stroke of each power piston causes air flow through the induction passage 34 and venturi throat 48. The air thusly flowing through the venturi throat 48 creates a low pressure commonly referred to as a venturi vacuum. The magnitude of such venturi vacuum is determined primarily by the velocity of the air flowing through the venturi and, of course, such velocity is determined by the speed and power output of the engine. The difference between the pressure in the venturi and the air pressure within fuel reservoir chamber 58 causes fuel to flow from fuel chamber 58 through the main metering system. That is, the fuel flows through metering restriction 78, conduit means 62, up through well 64 and, after mixing with the air supplied by the main well air bleed means 72, passes through conduit means 70 and discharges from nozzle 50 into induction passage means 34. Generally, the calibration of the various controlling elements are such as to cause such main metered fuel flow to start to occur at some predetermined differential between fuel reservoir and venturi pressure. Such a differential may exist, for example, at a vehicular speed of 30 m.p.h. at normal road load.

Engine and vehicle operation at conditions less than that required to initiate operation of the main metering system are achieved by operation of the idle fuel metering system, which may not only supply metered fuel flow during curb idle engine operation but also at off idle operation.

At curb idle and other relatively low speeds of engine operation, the engine does not cause a sufficient air flow through the venturi section 48 as to result in a venturi vacuum sufficient to operate the main metering system. Because of the relatively almost closed throttle valve means 52, which greatly restricts air flow into the intake manifold 26 at idle and low engine speeds, engine or intake manifold vacuum is of a relatively high magnitude. This high manifold vacuum serves to provide a pressure differential which operates the idle fuel metering system.

Generally, the idle fuel system is illustrated as comprising calibrated idle fuel restriction metering means 82 and passage means 83 communicating as between a source of fuel, as within, for example, the fuel well 64, and a generally upwardly extending passage or conduit 86 the lower end of which communicates with a generally laterally extending conduit 88. A downwardly depending conduit 90 communicates at its upper end with conduit 88 while, at its lower end, it communicates with induction passage means 34 as through aperture means 92. The effective size of discharge aperture 92 is variably established as by an axially adjustable needle valve member 94 threadably carried by body 32. As generally shown and as generally known in the art, passage 88 may terminate in a relatively vertically elongated discharge opening or aperture 96 located as to be generally juxtaposed to an edge of throttle valve 52 when such throttle valve 52 is in its curb-idle or nominally closed position. Often, aperture 96 is referred to in the art as being a transfer slot effectively increasing the area for flow of fuel to the underside of throttle valve 52 as the throttle valve is moved toward a more fully opened position.

Conduit means 98, provided with calibrated air metering or restriction means 100, serves to communicate as between an upper portion of conduit 86 and a source of atmospheric air as at the inlet end 36 of induction passage 34.

At idle engine operation, the greatly reduced pressure area below the throttle valve means causes fuel to flow as from the fuel reservoir 58 and well 64 through conduit means 83 and restriction means 82 and generally intermixes with the bleed air provided by conduit 98 and air bleed restriction means 100. The fuel-air emulsion then is drawn downwardly through conduit 86 and through conduits 88 and 90 ultimately discharged, posterior to throttle valve 52, through the effective opening of aperture 92.

During off-idle operation, the throttle valve means 52 is moved in the opening direction causing the juxtaposed edge of the throttle valve to further effectively open and expose a greater portion of the transfer slot or port means 96 to the manifold vacuum existing posterior to the throttle valve. This, of course, causes additional metered idle fuel flow through the transfer port means 96. As the throttle valve means 52 is opened still wider and the engine speed increases, the velocity of air flow through the induction passage 34 increases to the point where the resulting developed venturi vacuum is sufficient to cause the hereinbefore described main metering system to be brought into operation.

The invention as herein disclosed and described provides means, in addition to those hereinbefore described, for controlling and/or modifying the metering characteristics otherwise established by the fluid circuit constants previously described. In the embodiment disclosed, among other cooperating elements, solenoid valving means 102 is provided to enable the performance of such modifying and/or control functions.

The solenoid valving means 102 is illustrated in greater detail in FIG. 3 and the detail description thereof will hereinafter be presented in regard to the consideration of said FIG. 3. However, at this point, and still with reference to FIG. 2, it will be sufficient to point out that, in the embodiment disclosed, the solenoid means or assembly 102 has an operative upper end and an operative lower end and that such means or assembly 102 is carried by the carbureting body means as, for example, to be partly received by the fuel reservoir 58. As generally depicted in FIG. 2, the lower operative end of solenoid valving means or assembly 102 is operatively received as by an opening 104 formed as in the interior of fuel reservoir 58 with such opening 104 generally, in turn, communicating with passage means 106 leading to the main fuel well 64. In fact, as also depicted, the idle fuel passage 83 may communicate with main well 64 through a portion of such passage means 106 which is preferably provided with calibrated restriction means 108.

The carbureting means 28 may be comprised of an upper disposed body or housing section 110 provided as with a cover-like portion 112 which serves to in effect cover the fuel reservoir 58. As also depicted in FIG. 2, the upper end of solenoid assembly 102 may be generally received through cover section 112 as to have the upper end of assembly 102 received as by an opening 114 formed as within a cap-like housing or body portion 116 which has a relatively enlarged passage or chamber 118 formed therein and communicating with laterally extending passages or conduits 120 and 122 which, in turn, respectively communicate with illustrated downwardly extending passage or conduits 124 and 126. A conduit 128, formed in housing section 110, serves to interconnect and complete communication as between the lower end of conduit 124 and the upper end of conduit 86, while a second conduit 130, also formed in housing section 110, serves to interconnect and complete communication as between the lower end of conduit 126 and a source of ambient atmosphere as, preferably, at a point in the air inlet end of induction passage means 34. Such may take the form of an opening 132, communicating with passage means 34, situated generally downstream of choke ir air valve means 38.

Figure 3:
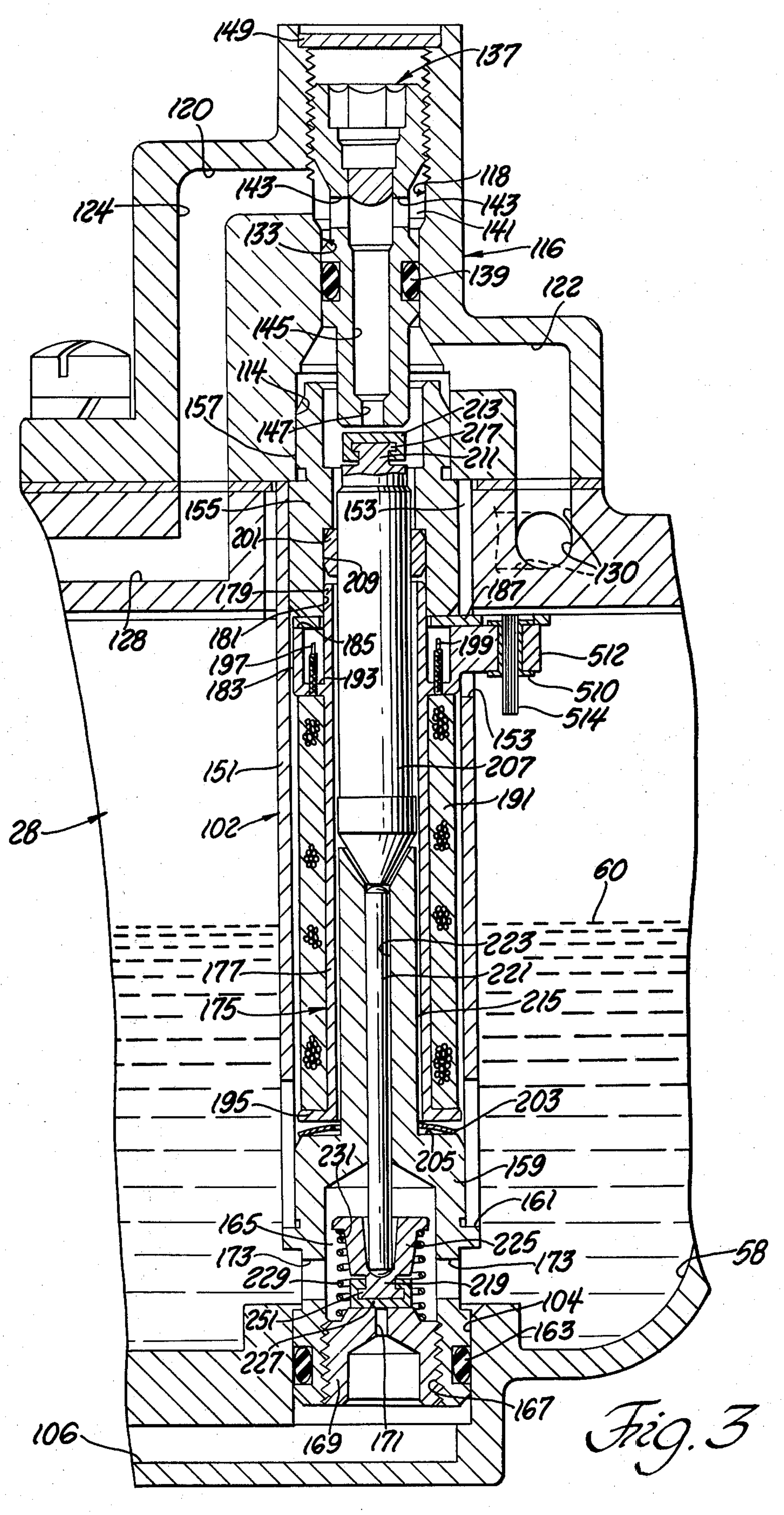
FIG. 3 is an enlarged axial cross-sectional view of one of the elements shown in FIG. 2 with fragmentary portions of related structure also shown in FIG. 2.

Referring in greater detail to both FIGS. 2 and 3, and in particular to FIG. 3, chamber 118 of housing portion 116 is shown as having a cylindrical passage portion 133 with an axially extending section thereof being internally threaded as at 135 in order to threadably engage a generally tubular valve seat member 137 which has its inner-most end provided with an annular seal, such as an O-ring, 139 thereby sealing such inner-most end of member 137 against the surface of cylindrical passage portion 133. As depicted, valve seat member 137 is generally necked-down at its mid-section thereby providing for an annular chamber 141 thereabout with such annular chamber 141 being, of course, partly defined by a cooperating portion of chamber or passage means 118. A plurality of generally radially directed apertures or passages 143 serve to complete communication as between annular chambe 141 and an axially extending conduit 145, formed in the body of valve seat member 137, which, in turn, communicates with a valve seat calibrated orifice or passage 147. After the valve seat member 137 is threadably axially positioned in the selected relationship, a suitable chamber closure member 149 may be placed in the otherwise open end of chamber 118.

The solenoid assembly 102 is illustrated as comprising a generally tubular outer case 151 the upper end of which is slotted, as depicted at 153, and receives an upper end sleeve member 155 which may be secured to the outer case or housing 151 as by, for example, having the end member 155 pressed into the housing 151 and then further crimping housing 151 against member 155. The outer surface 157 of the upper end of sleeve member 155 is closely received within cooperating receiving opening 114.

A generally lower disposed end sleeve member 159 may be similarly received by the lower open end of case or housing 151 and suitably secured thereto as by, for example, crimping. Preferably, sleeve member 159 is provided with a flange portion 161 against which the end of case 151 may axially abut. The lower-most end of sleeve member 159 is closely received within cooperating opening or passage 104 and is provided with an annular groove or recess which, in turn, receives and retains a seal, such as, for example, an "O"-ring, 163 which serves to assure such lower-most portion of sleeve 159 being peripherally sealed against the surface of opening 104. A generally medially situated chamber 165, formed in sleeve member 159, is preferably provided with an internally threaded portion 167 which threadably engages a threadably axially adjustable valve seat member 169 which, in turn, is provided with a calibrated valve orifice or passageway 171 effective for communicating as between chamber 165 and passage or conduit means 106. A plurality of generally radially directed apertures or passages 173 serve to complete communication as between chamber 165 and the interior of the fuel reservoir 58.

A spool-like member 175 has an axially extending cylindrical tubular portion 177 the upper end 179 of which is closely received within a cooperating recess-like aperture 181 provided by upper sleeve member 155. Near the upper end of spool member 175, such member is provided with a generally cylindrical cup-like portion 183 which, in turn, defines an upper disposed abutment or axial end mounting surface 185 which abuts as against a flat insulating member 187 situated against the lower end surface 189 of upper sleeve member 155 and about the upper portion 179 of tubular portion 177. An electrical coil or winding 191, carried generally about tubular portion 177 and between axial end walls 193 and 195 of spool 175, may have its leads 197 and 199 pass as through wall portion 193 for connection to related circuitry, to be described. An annular bowed spring 203 is axially contained between end wall 195 of spool 175 and the upper face 205 of lower sleeve member 159 and serves to resiliently hold the spool and coil assembly (175 and 191) in its depicted assembled condition within case or housing 151.

A cylindrical armature 207, slidably reciprocatingly received within tubular portion 177 and aligned passageway 209, formed as in a bushing member 201 situated in sleeve member 155, has an upper disposed axial extension 211 and an integrally formed annular flange-like portion 217 which internally engage and both laterally and axially retain a related, at least somewhat resilient, generally cup-like valve member 213.

Somewhat similarly, the lower end of armature 207 is in operative abutting engagement with an axial extension, such as a pin or rod 221 which passes through a clearance passageway 223, formed in lower sleeve member 159, (including its tubular extension 215 received with tubular portion 177 of spool 175) and abutably engages a lower disposed valving member 225 which is provided with an axial extension 219 and integrally formed annular flange 251 which internally engage and laterally and axially retain, at least a somewhat resilient, generally cup-like valve member 227. A compression spring 229 has one end seated as against valve seat member 169 and its other end seated against a suitable flange portion 231 of valving member 225 as to thereby normally yieldingly urge the valve member 227 and armature 207 axially away from the valve seat member 169 (that being the opening direction for valve passageway 171).

As should be apparent, upon energization and de-energization of the coil 191, armature 207 will experience reciprocating motion with the result that, in alternating fashion, valve member 213 will close and open calibrated passageway 147 while valve member 227 will open and close calibrated passageway 171.

Without, at this point, considering the overall operation, it should now be apparent that when, for example, armature 207 is in its upper-most position and valve member 227 has fully closed passageway or orifice 147, all communication between conduits 120 and 122 is terminated. Therefore, the only source for any bleed air, to be mixed with raw or solid fuel being drawn through conduit means 83 (to thereby create the fuel-air emulsion previously referred to herein), is through bleed air passage 98 and calibrated bleed air restriction means 100 (FIG. 2). The ratio of fuel-to-air in such an emulsion (under such an assumed condition) will be determined by the restrictive quality of air bleed restriction means 100, alone.

However, let it be assumed that armature 207 has moved to its lowest-most position, as depicted, and that valve member 213 has, thereby, fully opened calibrated passageway 147. Under such an assumed condition, it can be seen that communication, via passage or orifice 147, is completed as between conduits 120 and 122 with the result that now, the top of conduit 86 (FIG. 2) is in controlled (by virtue of the restrictive qualities or characteristics occurring at passageway 147) communication with a source of ambient atmosphere via conduits 128, 124, 120, 143, 145, 147, 122, 126 and 130 and opening 132 (FIG. 2). Accordingly, it can be seen that under such an assumed condition the source for bleed air, to be mixed with raw or solid fuel being drawn through conduit means 83 (to thereby create the fuel-air emulsion hereinbefore referred to), is through both bleed air passage 98 and restriction means 100 as well as conduit means 130 as set forth above. Therefore, it can be readily seen that under such an assumed condition significantly more bleed-air will be available and the resulting ratio of fuel-to-air in such an emulsion will be accordingly significantly leaner (in terms of fuel) than the fuel-to-air ratio obtained when only conduit 98 and restriction 100 were the sole source for bleed air.

Obviously, the two assumed conditions discussed above are extremes and an entire range of conditions exist between such extremes. Further, since the armature 207 and valve member 213 will, during operation, intermittently reciprocatingly open and close passageway or orifice 147, the percentage of time, within any selected unit or span of time used as a reference, that the orifice 147 is opened will determine the degree to which such variably determined additional bleed air becomes available for intermixing with the said raw or solid fuel.

Generally, and by way of summary, with proportionately greater rate of flow of idle bleed air, the less, proportionately, is the rate of metered idle fuel flow thereby causing a reduction in the richness (in terms of fuel) in the fuel-air mixture supplied through the induction passage 34 and into the intake manifold 26. The converse is also true; that is, as aperture or orifice means 147 is more nearly totally, in terms of time, closed, the total rate of idle bleed air becomes increasingly more dependent upon the comparatively reduced effective flow area of restriction means 100 thereby proportionately reducing the rate of idle bleed air and increasing, proportionately, the rate of metered idle fuel flow and, thereby, resulting in an increase in the richness (in terms of fuel) in the fuel-air mixture supplied through induction passage 34 and into the intake manifold 26.

Further, and still without considering the overall operation of the invention, it should be apparent that for any selected metering pressure differential between the venturi vacuum, $P_v$, and the pressure, $P_a$, within reservoir 58, the "richness" of the fuel delivered by the main fuel metering system can be modulated merely by the moving of valve member 227 toward and/or away from coacting aperture means 171. That is, for any such given metering pressure differential, the greater the effective opening of aperture 171 becomes, the greater also becomes the rate of metered fuel flow since one of the factors controlling such rate is the effective area of the metering orifice means. Obviously, in the embodiment disclosed, the effective flow area of orifice means 171 is fixed; however, the effectiveness of flow permitted therethrough is related to the percentage of time, within any selected unit or span of time used as a reference, that the orifice means 171 is opened (valving means 225 and valve member 227 being moved away from passage means 171) thereby permitting an increase in the rate of fuel flow through passages 173, 165, 171 and 106 to main fuel well 64 (FIG. 2). With such opening of orifice means 171 it can be seen that the metering area of orifice means 171 is, generally, additive to the effective metering area of orifice means 78. Therefore, a comparatively increased rate of metered fuel flow is consequently discharged, through nozzle 50, into the induction passage means 34. The converse is also true; that is, the less that orifice means 171 is effectively open or opened, the total effective main fuel metering area effectively decreases and approaches that effective area determined by metering means 78. Consequently, the total rate of metered main fuel flow decreases and a comparatively decreased rate of metered fuel flow is discharged through nozzle 50 into the induction passage 34.

FIG. 1 further illustrates suitable logic control means 160 which may be electrical logic control means having suitable electrical signal conveying conductor means 162, 164, 166 and 168 leading thereto for applying electrical input signals, reflective of selected operating parameters, to the circuitry of logic means 160. It should, of course, be apparent that such input signals may convey the required information in terms of the magnitude of the signal as well as conveying information by the presence of absence of the signal itself. Output electrical conductor means, as at 170, serves to convey the output electrical control signal from the logic means 160 to associated electrically-operated control valve means 172. A suitable source of electrical potential 174 is shown as being electrically connected to logic means 160, while control valve means 172 may be electrically grounded, as at 176.

In the embodiment disclosed, the various electrical conductor means 162, 164, 166 and 168 are respectively connected to parameter sensing and transducer signal producing means 178, 180 and 182. In the embodiment shown, the means 178 comprises oxygen sensor means communicating with exhaust conduit means 22 at a point generally upstream of a catalytic converter 184. The transducer means 180 may comprise electrical switch means situated as to be actuated by cooperating lever means 186 fixedly carried, as by the throttle shaft 54, and swingably rotatable therewith into and out of operating engagement with switch means 180, in order to thereby provide a signal indicative of the throttle 52 having attained a preselected position.

The transducer 182 may comprise suitable temperature responsive means, such as, for example, thermocouple means, effective for sensing engine temperature and creating an electrical signal in accordance therewith.

Figure 7:
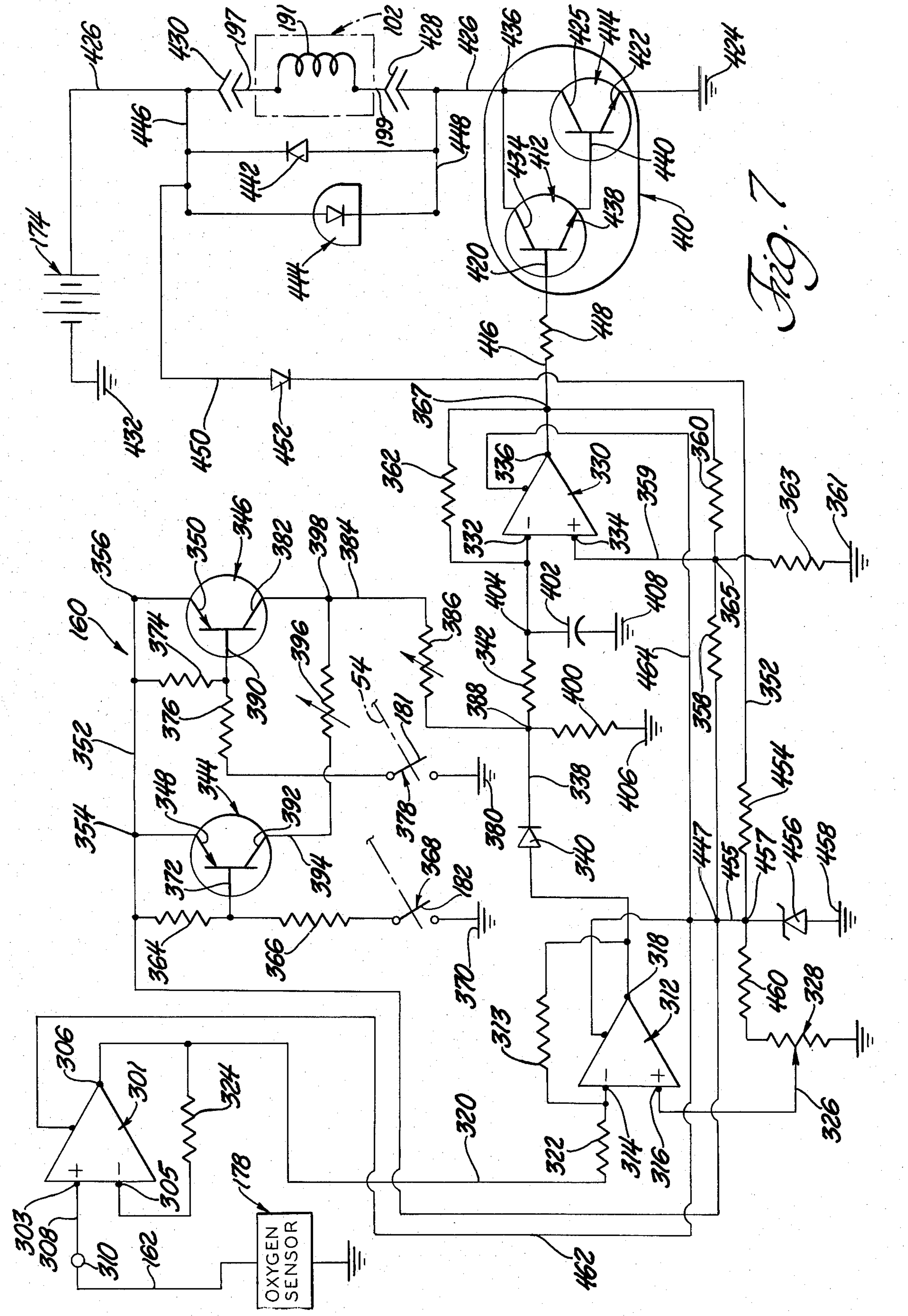
FIG. 7 is a schematic wiring diagram of circuitry employable in association with the invention.

FIG. 7 illustrates, by way of example, a form of circuitry employable as the logic circuitry 160 of FIG. 1. Referring now in greater detail to FIG. 7, such a one embodiment of the control and logic circuit means 160 is illustrated as comprising a first operational amplifier 301 having input terminals 303 and 305 along with output terminal means 306. Input terminal 303 is electrically connected as by conductor means 308 and a connecting terminal 310 as to output electrical conductor means 162 leading from the oxygen sensor 178. Although the invention is not so limited, it has, nevertheless, been discovered that excellent results are obtainable by employing an oxygen sensor assembly produced commercially by the Electronics Division of Robert Bosch GmbH of Schwieberdingen, Germany and as generally illustrated and described on pages 137–144 of the book entitled "Automotive Electronics II" published February 1975, by the Society of Automotive Engineers, Inc., 400 Commonwealth Drive, Warrendale, Pa., bearing U.S.A. copyright notice of 1975, and further identified as SAE (Society of Automotive Engineers, Inc.) Publication No. SP-393. Generally, such an oxygen sensor comprises a ceramic tube or cone of zirconium dioxide doped with selected metal oxides with the inner and outer surfaces of the tube or cone being coated with a layer of platinum. Suitable electrode means are carried by the ceramic tube or cone as to thereby result in a voltage thereacross in response to the degree of oxygen present in the exhaust gases flowing by the ceramic tube. Generally, as the presence of oxygen in the exhaust gases decreases, the voltage developed by the oxygen sensor decreases.

A second operational amplifier 312 has input terminals 314 and 136 along with output terminal means 318. Inverting input terminal 314 is electrically connected as by conductor means 320 and resistor means 322 to the output 306 of amplifier 301. Amplifier 301 has its inverting input 305 electrically connected via feedback circuit means, comprising resistor 324, electrically connected to the output 306 as by conductor means 320. The input terminal 316 of amplifier 312 is connected as by conductor means 326 to potentiometer means 328.

A third operational amplifier 330, provided with input terminals 332 and 334 along with output terminal means 336, has its inverting input terminal 332 electrically connected to the output 318 of amplifier 312 as by conductor means 338 and diode means 340 and resistance means 342 serially situated therein.

First and second transistor means 344 and 346 each have their respective emitter terminals 348 and 350 electrically connected, as at 354 and 356, to conductor means 352 leading to the conductor means 455 as at 447. A resistor 358, has one end connected to conductor 455 and its other resistor end connected to conductor 359 leading from input terminal 334 to ground 361 as through a resistor 363. Further a resistor 360 has its opposite ends electrically connected as at points 365 and 367 to conductors 359 and 416. A feedback circuit comprising resistance means 362 is placed as to be electrically connected to the output and input terminals 336 and 332 of amplifier 330.

A voltage divider network comprising resistor means 364 and 366 has one electrical end connected to conductor means 352 as at a point between 354 and resistor 358. The other electrical end of the voltage divider is connected as to switch means 368 which, when closed, completes a circuit as to ground at 370. The base terminal 372 of transistor 344 is connected to the voltage divider as at a point between resistors 364 and 366.

A second voltage divider network comprising resistor means 374 and 376 has one electrical end connected to conductor means 352 as at a point between 354 and 356. The other electrical end of the voltage divider is connected as to second switch means 378 which, when closed, completes a circuit as to ground at 380. The base terminal 390 of transistor 346 is connected to the voltage divider as at a point between resistors 374 and 376. Collector electrode 382 of transistor 346 is electrically connected, as by conductor means 384 and serially situated resistor means 386 (which, as shown, may be variable resistance means), to conductor means 338 as at a point 388 generally between diode 340 and resistor 342. Somewhat similarly, the collector electrode 392 of transistor 344 is electrically connected, as by conductor means 394 and serially situated resistor means 396 (which, as shown, may also be a variable resistance means), to conductor means 384 as at a point 398 generally between collector 382 and resistor 386.

As also shown, resistor and capacitor means 400 and 402 have their respective one electrical ends or sides connected to conductor means as at points 388 and 404 while their respective other electrical ends are connected to ground as at 406 and 408. Point 404 is, as shown, generally between input terminal 332 and resistor 342.

A Darlington circuit 410, comprising transistors 412 and 414, is electrically connected to the output 336 of operational amplifier 330 as by conductor means 416 and serially situated resistor means 418 being electrically connected to the base terminal 420 of transistor 412. The emitter electrode 422 of transistor 414 is connected to ground 424 while the collector 425 thereof is electrically connected as by conductor means 426 connectable, as at 428 and 430, to related solenoid means 102, and leading to the related source of electrical potential 174 grounded as at 432.

The collector 434 of transistor 412 is electrically connected to conductor means 426, as at point 436, while the emitter 438 thereof is electrically connected to the base terminal 440 of transistor 414.

Preferably, a diode 442 is placed in parallel with solenoid means 102 and a light-emitting-diode 444 is provided to visually indicate the condition of operation. Diodes 442 and 444 are electrically connected to conductor means 426 as by conductors 446 and 448.

Conductor means 450, connected to source 174 as by means of conductor 446 and comprising serially situated diode means 452 and resistance means 454, is connected to conductor means 455, as at 457, leading generally between amplifier 312 and one side of a zener diode 456 the other side of which is connected to ground as at 458. Additional resistance means 460 is situated in series as between potentiometer 328 and point 457 of conductor 455. Conductor 455 also serves as a power supply conductor to amplifier 312; similarly, conductor 426 and 464, each connected as to conductor means 455, serve as power supply conductor to operational amplifier 301 and 330, respectively.

OPERATION OF THE INVENTION

Generally, the oxygen sensor 178 senses the oxygen content of the exhaust gases and, in response thereto, produces an output voltage signal which is proportional or otherwise related thereto. The voltage signal is then applied, as via conductor means 162, to the electronic logic and control means 160 which, in turn, compares the sensor voltage signal to a bias or reference voltage which is indicative of the desired oxygen concentration. The resulting difference between the sensor voltage signal and the bias voltage is indicative of the actual error and an electrical error signal, reflective thereof, is employed to produce a related operating voltage which is ultimately applied to the solenoid valving means 102 as by conductor means schematically shown at 197 and 199.

Figure 5:
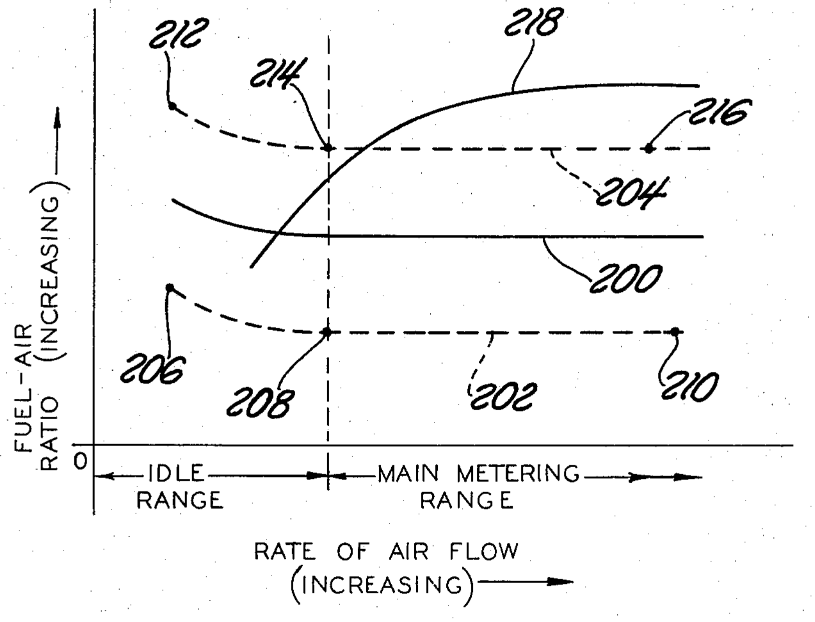
FIG. 5 is a graph illustrating, generally, fuel-air ratio curves obtainable with structures employing teachings of the invention.

The graph of FIG. 5 generally depicts fuel-air ratio curves obtainable by the inventon. For purposes of illustration, let it be assumed that curve 200 represents a combustible mixture, metered as to have a ratio of 0.068 lbs. of fuel per pound of air. Then, as generally shown, the carbureting device 28 could provide a flow of combustible mixtures in the range anywhere from a selected lower-most fuel-air ratio as depicted by curve 202 to an uppermost fuel-air ratio as depicted by curve 204. As should be apparent, the invention is capable of providing an infinite family of such fuel-air ratio curves between and including curves 202 and 204. This becomes especially evident when one considers that the portion of curve 202 generally between points 206 and 208 is achieved when valving member 213 of FIG. 3 is moved as to more fully effectively open orifice 147, to its maximum intended effective opening, and cause the introduction of a maximum amount of bleed air therethrough. Similarly, that portion of curve 202 generally between points 208 and 210 is achieved when valve member 227 of FIG. 3 is moved downwardly as to thereby close orifice 171 to its intended minimum effective opening (or totally effectively closed) and cause the flow of fuel therethrough to be terminated or reduced accordingly.

In comparison, that portion of curve 204 generally between points 212 and 214 is achieved when valving member 213 of FIG. 3 is moved as to more fully effectively close orifice 147 to its intended minimum effective opening (or totally effectively closed) and cause the flow of bleed air therethrough to be terminated or reduced accordingly. Similarly, that portion of curve 204 generally between points 214 and 216 is achieved when valve member 227 is moved upwardly as to thereby open orifice 171 to its maximum intended opening and cause a corresponding maximum flow of fuel therethrough.

It should be apparent that the degree to which orifices 147 and 171 are respectively effectively opened, during actual operation, depends on the control signal produced by the logic control means 160 and, of course, the control signal thusly produced by means 160 depends, basically, on the input signal obtained from the oxygen sensor 178, as compared to the previously referred-to bias or reference signal. Accordingly, knowing what the desired composition of the exhaust gas from the engine should be, it then becomes possible to program the logic of means 160 as to create signals indicating deviations from such desired composition as to in accordance therewith modify the effective opening of orifices 147 and 171 to increase and/or decrease the richness (in terms of fuel) of the fuel-air mixture being metered to the engine. Such changes or modifications in fuel richness, of course, are, in turn, sensed by the oxygen sensor 178 which continues to further modify the fuel-air ratio of such metered mixture until the desired exhaust composition is attained. Accordingly, it is apparent that the system disclosed defines a closed-loop feedback system which continually operates to modify the fuel-air ratio of a metered combustible mixture assuring such mixture to be of a desired fuel-air ratio for the then existing operating parameters.

It is also contemplated, at least in certain circumstances, that the upper-most curve 204 may actually be, for the most part, effectively below a curve 218 which, in this instance, is employed to represent a hypothetical curve depicting the best fuel-air ratio of a combustible mixture for obtaining maximum power from engine 10, as during wide open throttle (WOT) operation. In such a contemplated contingency, transducer means 180 (FIG. 1) may be adapted to be operatively engaged, as by lever means 186, when throttle valve 52 has been moved to WOT condition. At that time, the resulting signal from transducer means 180, as applied to means 160, causes logic means 160 to appropriately respond by further altering the effective opening of orifices 147 and 171. That is, if it is assumed that curve portion 214–216 is obtained when orifice means 171 is effectively opened to a degree less than its maximum effective opening, then further effective opening thereof may be accomplished by causing a proportionately longest (in terms of time) opening movement of valve member 227. During such phase of operation, the metering becomes an open loop function and the input signal to logic means 160 provided by oxygen sensor 178 is, in effect, ignored for so long as the WOT signal from transducer 180 exists.

Similarly, in certain engines, because of any of a number of factors, it may be desirable to assure a lean (in terms of fuel richness) base fuel-air ratio enriched (by the well known choke mechanism) immediately upon starting of a cold engine. Accordingly, engine temperature transducer means 182 may be employed for producing a signal, over a predetermined range of low engine temperatures, and applying such signal to logic control means 160 as to thereby cause such logic means 160 to, in turn produce and apply a control signal, via 197 and 199 to solenoid fuel valving means 102 as to cause the resulting fuel-air ratio of the metered combustible mixture to be, for example, in accordance with curve 202 of FIG. 5 or some other selected relatively "lean" fuel-air ratio.

Further, it is contemplated that at certain operating conditions and with certain oxygen sensors it may be desirable or even necessary to measure the temperature of the oxygen sensor itself. Accordingly, suitable temperature transducer means, as for example thermocouple means well known in the art, may be employed to sense the temperature of the operating portion of the oxygen sensor means 178 and to provide a signal in accordance or in response thereto as via conductor means 164 to the electronic control means 160. That is, it is anticipated that it may be necessary to measure the temperature of the sensory portion of the oxygen sensor 178 to determine that such sensor 178 is sufficiently hot to provide a meaningful signal with respect to the composition of the exhaust gas. For example, upon re-staring a generally hot engine, the engine temperature and engine coolant temperatures could be normal (as sensed by transducer means 182) and yet the oxygen sensor 178 is still too cold and therefore not capable of providing a meaningful signal, of the exhaust gas composition, for several seconds after such re-start. Because a cold catalyst cannot clean-up from a rich mixture, it is advantageous, during the time that sensor means 178 is thusly too cold, to provide a relatively "lean" fuel-air ratio mixture. The sensor means 178 temperature signal thusly provided along conductor means 164 may serve to cause such logic means 160 to, in turn, produce and apply a control signal, as via 197 and 199 to solenoid valving means 102, the magnitude of which is such as to cause the resulting fuel-air ratio of the metered combustible mixture to be, for example, in accordance with curve 202 of FIG. 5 or some other selected relatively "lean" fuel-air ratio.

Figure 6:
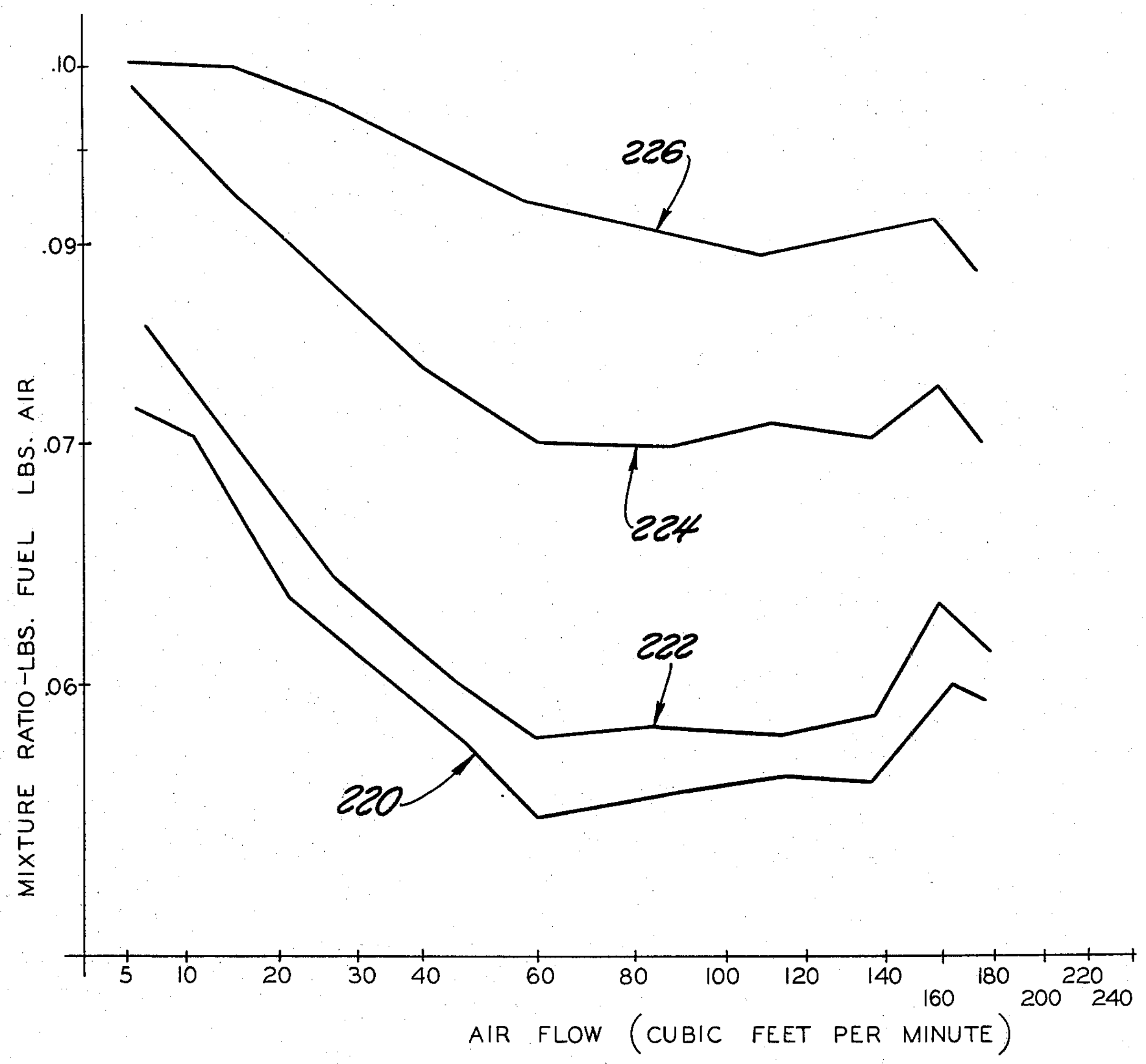
FIG. 6 is a graph depicting, by way of example, fuel-air ratio curves obtainable from embodiments employing teachings of the invention.

FIG. 6 illustrates fuel-air mixture curves obtainable with embodiments employing teachings of the invention with such curves being obtained at various conditions of engine operation. That is, flow curve 220 corresponds generally to a typical part throttle fuel delivery curve while the flow curve 226 corresponds generally to a typical best engine power or wide open throttle delivery curve. Curves 222 and 224 are, of course, illustrative of a family of mid-range flow curves. In the embodiment of the invention disclosed the weight of armature means 207, and associated movable structure, is overcome by the force and preload of spring 229, whenever the coil 191 is in a de-energized state, thereby causing valve member 213 to become fully seated against and closing passage 147 while valve member 227 becomes fully unseated from passage 171.

Accordingly, it can be seen that in the event of a total electronic failure in the system disclosed, the associated vehicle remains drivable.

Referring in greater detail to FIG. 7 and the logic circuitry illustrated therein, the oxygen sensor 178 produces a voltage input signal along conductor means 162, terminal 310 and conductor means 162, terminal 310 and conductor means 308 to the input terminal 303 of operational amplifier 301. Such input signal is a voltage signal indicative of the degree of oxygen present in the exhaust gases and sensed by the sensor 178.

Amplifier 301 is employed as a buffer and preferably has a very high input impedence. The output voltage at output 306 of amplifier 301 is the same magnitude, relative to ground, as the output voltage of the oxygen sensor 178. Accordingly, the output at terminal 306 follows the output of the oxygen sensor 178.

The output of amplifier 301 is applied via conductor means 320 and resistance 322 to the inverting input terminal 314 of amplifier 312. Feedback resistor 313 causes amplifier 312 to have a preselected gain so that the resulting amplified output at terminal 318 is applied via conductor means 338 to the inverting input 332 of amplifier 330. Generally, at this time it can be seen that if the signal on input 314 goes positive (+) then the output at terminal 318 will go negative (−) then the output at 336 of amplifier 330 will go positive (+).

The input 316 of amplifier 312 is connected as to the wiper of potentiometer 328 in order to selectively establish a set-point or a reference point bias for the system which will then represent the desired or reference value of fuel-air mixture and to then be able to sense deviations therefrom by the value of the signal generated by sensor 178.

Switch means 368, which may comprise the transducer switching (or equivalent structure) means 182, when closed, as when the engine is below some preselected temperature, causes transistor 344 to go into conduction thereby establishing a current flow through the emitter 348 and collector 392 thereof and through resistor means 396, point 388 and through resistor 400 to ground 406. The same happens when, for example, switch means 378, which may comprise the throttle operated switch 181, is closed during WOT operation. During such WOT conditions (or ranges of throttle opening movement) it is transistor 346 which becomes conductive. In any event, both transistors 344 and 346, when conductive, cause current flow into resistor 400.

An oscillator circuit comprises resistor 342, amplifier 330 and capacitor 402. When voltage is applied as to the left end of resistor 342, current will flow through such resistor 342 and tend to charge up capacitor 402. If it is assumed, for purposes of discussion, that the potential of the inverting input 332 is for some reason lower than that of the non-inverting input 334, the output of the operational amplifier at 336 will be relatively high and near or equal to the supply voltage of all of the operational amplifiers as derived from the zener diode 456. Consequently, current will flow as from point 367 through resistor 360 to point 365 and conductor 359, leading to the non-inverting input 334 of amplifier 330, and through resistor 363 to ground at 361. Therefore, it can be seen that when amplifier 330 is in conduction, there is a current component through resistor 360 tending to increase the voltage drop across resistor 363.

As current flows from resistor 342, capacitor 402 undergoes charging and such charging continues until its potential is the same as that of the non-inverting input 334 of amplifier 330. When such potential is attained, the magnitude of the output at 336 of operational amplifier is placed at a substantially ground potential and effectively places resistor 360 to ground. Therefore, the magnitude of the voltage at the non-inverting input terminal 334 suddenly drops and the inverting input 332 suddenly becomes at a higher potential than the non-inverting input 334. At the same time, resistor 362 is also effectively to ground thereby tending to discharge the capacitor 402.

The capacitor 402 will then discharge thereby decreasing in potential and approaching the now reduced potential of the non-inverting input 334. When the potential of capacitor 402 equals the potential of the non-inverting input 334, then the output 336 of amplifier 330 will suddenly go to its relatively high state again and the potential of the non-inverting input 334 suddenly becomes at a much higher potential than the discharged capacitor 402.

The preceding oscillating process keeps repeating.

The ratio of "on" time to "off" time of amplifier 330 depends on the voltage at 388. When that voltage is high, capacitor 402 will charge very quickly and discharge slowly, and amplifier 330 output will stay low for a long period. Conversely, when voltage at 388 is low, output of amplifier 330 will stay high for a long period.

The consequent signal generated by the turning "on" and turning "off" of amplifier 330 is applied to the base circuit of the Darlington circuit 410. When the output of amplifier 330 is "on" or as previously stated relatively high, the Darlington 410 is made conductive thereby energizing winding 191 of the solenoid valving assembly 102. Diode 442 is provided to suppress high voltage transients as may be generated by winding 191 while the LED may be employed, if desired, to provide visual indication of the operation of the winding 191.

As should be evident, the ratio of the "on" or high output time of amplifier 330 to the "off" or low output time of amplifier 330 determines the relative percentage or portion of the cycle time, or duty cycle, at which coil 191 is energized thereby directly determining the effective orifice opening of orifice 147.

Let it be assumed, for purposes of description, that the output of oxygen sensor 178 has gone positive (+) or increased meaning that the fuel-air mixture has become enriched (in terms of fuel). Such increased voltage signal is applied to input 314 of amplifier 312 and the output 318 of amplifier 312 drops in voltage because of the inverting of input 314. Because of this less voltage is applied to the resistor 342 and therefore it takes longer to charge up capacitor 402. Consequently, the ratio of the "on" or high output time to the "off" or low output time of amplifier 330 increases. This ultimately results in applying more average current to the coil 191 which, in turn, means that, in terms of percentage of time, valving orifice 147 is opened longer while valving orifice 171 is closed longer thereby reducing the rate of metered fuel flow through both the main and idle fuel system.

It should now also become apparent that with either or both switch means 368 and 378 being closed a greater voltage is applied to resistor 342 thereby reducing the charging time of the capacitor 402 with the result, as previously described, of altering the ratio of the "on" time to "off" time of amplifier 330.

When current, as through Darlington 440, is applied to coil or winding 191 of FIG. 3, the resulting magnetic field moves armature 207 and valving members 213 and 227 downwardly (for a proportionately longer period of time), as viewed in FIG. 3, causing valve member 227 to sealingly seat against valve seat member 169 and thereby terminate any communication as between passage 106 and chamber 165. At the same time, the downward movement of valve 213 permits communication to be established, through orifice means 147, between passage means 120 and 122. When the current through Darlington 440 is terminated, as during periods when the output of amplifier 330 is low or "off", the magnetic field created by the winding 191 ceases to exist and spring 229 moves armature 207 and valve members 213 and 227 upwardly causing valve member 213 to effectively sealingly seat against valve seat 137 to terminate communication as between passages 120 and 122. At the same time, the upward movement of valve member 227 permits communication to be established, through orifice means 171, between passage means 106 and chamber 165. Accordingly, it can be seen that, generally, when excess fuel richness is sensed (or amplifier 330 is "on"), communication as between passage 106 and chamber 165 is terminated while communication between passages 120 and 122 is completed. Likewise, generally, when an insufficient rate of fuel is being supplied and sensed (or amplifier 330 is "off") communication as between passage 106 and chamber 165 is completed while communication between passages 120 and 122 is terminated.

As should be apparent, even though in the preferred embodiment of the invention, when amplifier 330 is "off" the selection of spring 229 is such as to result in armature 207 and valve members 213 and 227 assuming a position opposite to that depicted in FIG. 3, such could be changed, if desired, as to have, during such "off" state of amplifier 330, the armature 207 and valve members 213 and 225 in a downmost position as depicted. In the embodiment disclosed, upon total failure of the related electrical system, the fuel-air ratio of the fuel metered to the engine would become "rich", in terms of fuel, while, if the armature 207 and members 213 and 227, during such "off" state of amplifier 330, are in a downmost position, upon total failure of the related electrical system, the fuel-air ratio of the fuel metered to the engine would become "lean", in terms of fuel.

In the event it is not yet totally apparent, threaded end members or adjustment members 169 and 137 are also employed for selectively adjusting or establishing the solenoid armature gap and stroke, respectively. That is, during assembly and calibration of the solenoid valving assembly 102 end members 169 and 137 are employed for positioning the armature 207 in a relatively advantageous position, force-wise, relative to the pole piece 215 and for establishing the maximum stroke or travel of the armature 207.

For example, referring to FIG. 3, let it be assumed that the entire solenoid valving assembly 102 is placed as within suitable fixture means and that, at such time, member 137 is not yet assembled thereto. Further, let it be assumed that gauge means such as, for example, a dial indicator gauge is placed as to be operatively against the axial end surface or valve face of valve member 213. Now with such assumed conditions, the adjustable member 169 is threadably rotated as to cause such member 169 to move downwardly (as viewed in FIG. 3). Such downward movement by member 169 is accompanied by a downward movement of push rod 221 and armature 207 and when member 169 is thusly moved downwardly a sufficient distance, the lower generally conical end of armature 207 finally abuts against the juxtaposed generally conical concave upper surface of pole piece 215. At this point member 169 is threadably rotated as to move upwardly (as viewed in FIG. 3) with such movement being continued until (in at least one successful embodiment of the invention) the dial indicator gauge indicates that the armature 207 (through the action of the push rod 221) has moved upwardly 0.015 inch. (The practice of the invention is not limited to any particular dimensional relationships; such being herein stated, by way of example, in order to clearly teach the many important benefits obtainable with the invention.) The ability of being able to so selectively position the armature 207 with respect to the pole piece 215 enables assuring the existance of a gap therebetween thereby, in turn, assuring that the armature 207 will be able, during actual operation, to move downwardly a distance sufficient to cause valving member 227 to close-off port or passage 171. Further, it has been discovered that the degree or magnitude of generated magnetic force varies somewhat in relationship to the mutual proximity of armature 207 and pole piece 215. It has also been discovered in one successful embodiment of the invention that, for example, positioning of the armature 0.015 to 0.030 inch axially away from the pole piece 215 apparently physically places the armature 207 in a position where it is acted upon by the most effective part of the generated magnetic force.

With the lower adjustable member 169 being thusly adjusted, let it be assumed that the dial indicator gauge is removed and that the member 137 is threadably engaged and threadably rotated as to move downwardly (as viewed in FIG. 3) with such downward motion continuing until orifice 147 is closed by the valve face of valve member 213 (such can be determined, for example, as by related flow gauges). At that time member 137 is then threadably rotated in the opposite direction as to move generally upwardly to where the lower end thereof is approximately 0.015 inch away from the valve face of valve member 213. The result of this is that a desirable armature-pole piece air gap is first attained and then the overall stroke or travel of the armature 207 is determined with such stroke, in the example disclosed, being 0.030 inch which is within the preferred distance, from the pole piece 215, for maximum magnetic field effect.

The adjustments described with regard to members 169 and 137 have been described in connection with the use of a dial indicator. However, it should be apparent that no such gauge is necessary and that reference thereto has been made primarily for ease of disclosure and related ease of mental visualization. It is equally possible to employ the actual axial lead of the threads of the members 137 and 169 in order to determine axial motion. For example, if the lead on the threads was 0.030 then a half-turn of such respective members 137 and 169 would equal an axial travel of 0.015 inch. Also, it would be possible to determine when the valve orifices 147 and 171 become closed as by related flow gauges as generally well known in the art.

Of course, while the solenoid valving assembly is in such a test or calibrating fixture means, the actual flows through the orifices 147 and 171, for various operating conditions and specifications, can be easily determined through associated test flow gauges. Slight deviations from prescribed limits can be overcome by the further adjustment of member 137 and/or 169.

Important advantages are gained because of being able to totally calibrate the solenoid valving assembly of the invention in test stand means or the like and not requiring that calibration thereof be conducted only after its assembly into a related cooperating carbureting structure. That is, the solenoid valving assembly 102 is a totally integrated self-contained valving assembly and as such can easily be calibrated to provide the desired flow rates through orifices 147 and 171 for specified conditions without having to first assemble such solenoid assembly into the carbureting structure where only then, in conjunction with components separately carried by the carbureting structure, a total or calibratable flow system is established. Consequently, it becomes possible, with the invention, to, if the need should ever arise, remove from a carbureting structure and replace a failed solenoid valving assembly (of the invention) with another (already calibrated) solenoid valving assembly (of the invention) without in any way having to make any further adjustments to such carbureting structure. This feature, of course: (a) minimizes any vehicular down-time as might be caused by a failure in the solenoid valving assembly; (b) reduces attendant labor costs and (c) maintains the integrity of the overall metering system and related structure thereby assuring, for example, that engine exhaust emissions will continue within prescribed limits.

Figure 4:
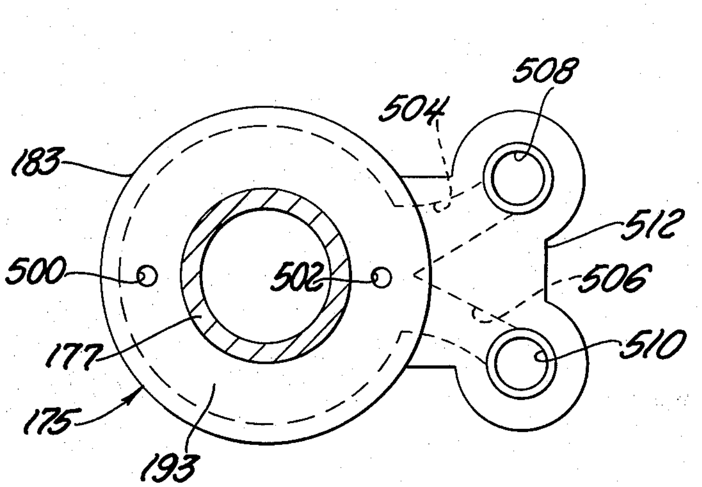
FIG. 4 is a cross-sectional view taken generally on the plane of line 4—4 of FIG. 3 and looking in the direction of the arrows.

Although various arrangements are, of course, possible, in the preferred embodiment the coil leads 197 and 199 (FIG. 3) may pass through suitable clearance or passage means 500 and 502 (FIG. 4) and pass through relieved portions 504, 506 (formed in integrally formed arm portion 512) and then be respectively received as within eyelets 508, 510 which also respectively receive enlarged conductor extensions of such leads 197 and 199 (one of such being partly depicted at 514 in FIG. 3). Such extensions may, of course, be brought out of the carburetor housing means in any suitable manner as to thereby, in effect, comprise the conductor means 197 and 199 as depicted in FIGS. 1 and 7.

Although only one preferred embodiment of the invention has been disclosed and described, it is apparent that other embodiments and modifications of the invention are possible within the scope of the appended claims.

What is claimed is:

1. A valving assembly for variably restricting fluid flow through first and second spaced flow orifice means, comprising housing means, said housing means comprising a first end member, a second end member, said first end member having a first portion for operative connection to associated structure, said second end member having a first portion for operative connection to associated structure, solenoid motor means, said solenoid motor means comprising axially extending spool means, said spool means comprising a generally centrally disposed tubular portion, a solenoid field winding carried by said spool means, axially extending armature means reciprocatingly situated in said tubular portion, a first opening formed through said first end member for permitting the free axial movement of said armature means therethrough, a second opening formed through said second end member for permitting the free axial movement of said armature means therethrough, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, resilient means effective for applying to said armature means only that resilient force tending to move said first valve member toward said first flow orifice means and said second valve member away from said second flow orifice means, and sleeve-like bushing means, said bushing means being carried within said first opening of said first end member and effective for slidably receiving said armature means.

2. A valving assembly for variably restricting fluid flow through first and second spaced flow orifice means, comprising housing means, said housing means comprising a first end member, a second end member, said first end member having a first portion for operative connection to associated structure, said second end member having a first portion for operative connection to associated structure, solenoid motor means, said solenoid motor means comprising axially extending spool means, said spool means comprising a generally centrally disposed tubular portion, a solenoid field winding carried by said spool means, axially extending armature means reciprocatingly situated in said tubular portion, a first opening formed through said first end member for permitting the free axial movement of said armature means therethrough, a second opening formed through said second end member for permitting the free axial movement of said armature means therethrough, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, and resilient means effective for applying to said armature means only that resilient force tending to move said first valve member toward said first flow orifice means and said second valve member away from said second flow orifice means, said second end member comprising a second portion received within said tubular portion and extending axially therewithin, and said second opening in said second end member extending through said second portion.

3. A valving assembly according to claim 1 wherein said second end member comprises a second portion received within said tubular portion and extending axially therewithin, and wherein said second opening in said second end member extends through said second portion.

4. A valving assembly for variably restricting fluid flow through first and second spaced flow orifice means, comprising housing means, said housing means comprising a first end member, a second end member, said first end member having a first portion for operative connection to associated structure, said second end member having a first portion for operative connection to associated structure, solenoid motor means, said solenoid motor means comprising axially extending spool means, said spool means comprising a generally centrally disposed tubular portion, a solenoid field winding carried by said spool means, axially extending armature means reciprocatingly situated in said tubular portion, a first opening formed through said first end member for permitting the free axial movement of said armature means therethrough, a second opening formed through said second end member for permitting the free axial movement of said armature means therethrough, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, resilient means effective for applying to said armature means only that resilient force tending to move said first valve member toward said first flow orifice means and said second valve member away from said second flow orifice means, said armature means comprising an axially extending extension, said extension extending through said second opening formed in said second end member, and said second valve member being in abutting engagement with said extension, and second resilient means carried generally within said housing means, said second resilient means being effective for yieldingly urging said spool means toward said first end member.

5. A valving assembly for variably restricting fluid flow through first and second spaced flow orifice means, comprising housing means, said housing means comprising a first end member, a second end member, said first end member having a first portion for operative connection to associated structure, said second end member having a first portion for operative connection to associated structure, solenoid motor means, said solenoid motor means comprising axially extending spool means, said spool means comprising a generally centrally disposed tubular portion, a solenoid field winding carried by said spool means, axially extending armature means reciprocatingly situated in said tubular portion, a first opening formed through said first end member for permitting the free axial movement of said armature means therethrough, a second opening formed through said second end member for permitting the free axial movement of said armature means therethrough, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, and resilient means effective for applying to said armature means only that resilient force tending to move said first valve member toward said first flow orifice means and said second valve member away from said second flow orifice means, said resilient means applying said resilient force to said armature means through operative engagement with said second valve member.

6. A valving assembly for variably restricting fluid flow through first and second spaced flow orifice means, comprising housing means, said housing means comprising a first end member, a second end member, said first end member having a first portion for operative connection to associated structure, said second end member having a first portion for operative connection to associated structure, solenoid motor means, said solenoid motor means comprising axially extending spool means, said spool means comprising a generally centrally disposed tubular portion, a solenoid field winding carried by said spool means, axially extending armature means reciprocatingly situated in said tubular portion, a first opening formed through said first end member for permitting the free axial movement of said armature means therethrough, a second opening formed through said second end member for permitting the free axial movement of said armature means therethrough, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, and resilient means effective for applying to said armature means only that resilient force tending to move said first valve member toward said first flow orifice means and said second valve member away from said second flow orifice means, said second orifice means being carried by said second end member, and said resilient means applying said resilient force to said armature means through operative engagement with both said second valve member and said second orifice means.

7. A valving assembly according to claim 6 wherein said second valve member comprises a valving member in axial abutting engagement with said armature means, and wherein said resilient means is effective for yieldingly urging said abutting engagement.

8. A valving assembly for variably restricting fluid flow through first and second spaced flow orifice means, comprising housing means, said housing means comprising a generally tubular housing portion, a first end closure portion, a second end closure portion, solenoid motor means, said solenoid motor means comprising axially extending spool means, said spool means comprising a generally centrally disposed spool tubular portion, a solenoid field winding carried by said spool means, axially extending armature means reciprocatingly situated in said spool tubular portion, a first opening formed through said first end closure portion for permitting the free axial movement of said armature means therein, a second opening formed through said second end closure portion for permitting the free axial movement of said armature means therein, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, resilient means effective for applying to said armature means only that resilient force tending to move said first valve member toward said first flow orifice means and said second valve member away from said second flow orifice means, and sleeve-like bushing means, said bushing means being carried by said first end closure portion and effective for slidably receiving said armature means.

9. A valving assembly for variably restricting fluid flow through first and second spaced flow orifice means, comprising housing means, said housing means comprising a generally tubular housing portion, a first end closure portion, a second end closure portion, solenoid motor means, said solenoid motor means comprising axially extending spool means, said spool means comprising a generally centrally disposed spool tubular portion, a solenoid field winding carried by said spool means, axially extending armature means reciprocatingly situated in said spool tubular portion, a first opening formed through said first end closure portion for permitting the free axial movement of said armature means therein, a second opening formed through said second end closure portion for permitting the free axial movement of said armature means therein, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, and resilient means effective for applying to said armature means only that resilient force tending to move said first valve member toward said first flow orifice means and said second valve member away from said second flow orifice means, said second end closure portion comprising a further portion received within said spool tubular portion and extending axially therewithin, and said second opening in said second closure portion extending through said further portion.

10. A valving assembly according to claim 8 wherein said second end closure portion comprises a further portion received within said spool tubular portion and extending axially therewithin, and wherein said second opening in said second end closure portion extends through said further portion.

11. A valving assembly for variably restricting fluid flow through first and second spaced flow orifice means, comprising housing means, said housing means comprising a generally tubular housing portion, a first end closure portion, a second end closure portion, solenoid motor means, said solenoid motor means comprising axially extending spool means, said spool means comprising a generally centrally disposed spool tubular portion, a solenoid field winding carried by said spool means, axially extending armature means reciprocatingly situated in said spool tubular portion, a first opening formed through said first end closure portion for permitting the free axial movement of said armature means therein, a second opening formed through said second end closure portion for permitting the free axial movement of said armature means therein, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, resilient means effective for applying to said armature means only that resilient force tending to move said first valve member toward said first flow orifice means and said second valve member away from said second flow orifice means, said armature means comprising an axially extending extension, said extension extending through said second opening formed in said second end closure portion, said second valve member being in operative abutting engagement with said extension, and second resilient means carried generally within said housing means, said second resilient means being effective for yieldingly urging said spool means toward said first end closure portion.

12. A valving assembly for variably restricting fluid flow through first and second spaced flow orifice means, comprising housing means, said housing means comprising a generally tubular housing portion, a first end closure portion, a second end closure portion, solenoid motor means, said solenoid motor means comprising axially extending spool means, said spool means comprising a generally centrally disposed spool tubular portion, a solenoid field winding carried by said spool means, axially extending armature means reciprocatingly situated in said spool tubular portion, a first opening formed through said first end closure portion for permitting the free axial movement of said armature means therein, a second opening formed through said second end closure portion for permitting the free axial movement of said armature means therein, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, and resilient means effective for applying to said armature means only that resilient force tending to move said first valve member toward said first flow orifice means and said second valve member away from said second flow orifice means, said resilient means applying said resilient force to said armature means through operative engagement with said second valve member.

13. A valving assembly for variably restricting fluid flow through first and second spaced flow orifice means, comprising housing means, said housing means comprising a generally tubular housing portion, a first end closure portion, a second end closure portion, solenoid motor means, said solenoid motor means comprising axially extending spool means, said spool means comprising a generally centrally disposed spool tubular portion, a solenoid field winding carried by said spool means, axially extending armature means reciprocatingly situated in said spool tubular portion, a first opening formed through said first end closure portion for permitting the free axial movement of said armature means therein, a second opening formed through said second end closure portion for permitting the free axial movement of said armature means therein, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving in unison with said armature means, and resilient means effective for applying to said armature means only that resilient force tending to move said first valve member toward said first flow orifice means and said second valve member away from said second flow orifice means, said second orifice means being carried by said second end closure portion, and said resilient means applying said resilient force to said armature means through operative engagement with both said second valve member and said second orifice means.

14. A valving assembly according to claim 13 wherein said second valve member comprises a valving member in axial abutting engagement with said armature means, and wherein said resilient means is effective for yieldingly urging said abutting engagement.

15. A valving assembly for variably restricting fluid flow through first and second spaced flow orifice means, comprising housing means, said housing means comprising a first end member, a second end member, said first end member having a first portion for operative connection to associated structure, said second end member having a first portion for operative connection to associated structure, solenoid motor means, said solenoid motor means comprising axially extending spool means, said spool means comprising a generally centrally disposed tubular portion, a solenoid field winding carried by said spool means, axially extending armature means reciprocatingly situated in said tubular portion, a first opening formed through said first end member for permitting the free axial movement of said armature means therethrough, a second opening formed through said second end member for permitting the free axial movement of said armature means therethrough, a first valve member operatively connected to a first axial end of said armature means as to be effective to be juxtaposed to said first flow orifice means, a second valve member operatively connected to a second axial end of said armature means opposite to said first axial end as to be effective to be juxtaposed to said second flow orifice means, said first and second valve members moving always in unison with said armature means, and resilient means effective for applying to said armature means only that resilient force tending to move said first valve member toward said first flow orifice means and said second valve member away from said second flow orifice means, said second end member carrying an adjustable body, said adjustable body being selectively adjustable toward and away from said armature means, a passage formed through said adjustable body, and said second spaced flow orifice means comprising said passage formed through said adjustable body.

16. A valving assembly according to claim 15 wherein said resilient means is seated against said adjustable body.

17. A valving assembly according to claim 15 wherein said adjustable body is effective for axially selectively positioning said armature means relative to said solenoid field winding.

* * * * *